United States Patent [19]

Welsh

[11] Patent Number: 4,702,178

[45] Date of Patent: Oct. 27, 1987

[54] EMERGENCY EXHAUST SYSTEM FOR HAZARDOUS WASTE INCINERATOR

[75] Inventor: James N. Welsh, Dallas, Tex.

[73] Assignee: Shirco Infrared Systems, Inc., Dallas, Tex.

[21] Appl. No.: 867,211

[22] Filed: May 27, 1986

[51] Int. Cl.$^4$ .............................................. F23N 5/24
[52] U.S. Cl. ..................................... 110/193; 110/163; 110/185; 110/215; 110/216; 110/250; 110/304; 110/346
[58] Field of Search ................ 110/185, 193, 215–216, 110/233, 235, 237–238, 250, 255, 257, 346, 203–207, 267–270, 286, 293, 327–329, 297, 301–304, 119, 123, 147, 163, 219; 98/115.1; 126/285 R, 286, 292; 236/1 G; 266/174, 903; 55/223, 233, 259, 316

[56] References Cited

U.S. PATENT DOCUMENTS

| Re. 31,256 | 5/1983 | Schmidt | 110/163 X |
|---|---|---|---|
| 3,148,665 | 9/1964 | Switzer, Jr. | 110/304 X |
| 3,557,725 | 1/1971 | Stookey | 110/185 |
| 3,730,112 | 5/1973 | Hutchinson et al. | 110/193 |
| 3,805,884 | 4/1974 | Burt et al. | 110/163 X |
| 3,844,233 | 10/1974 | Fishback | 110/193 |
| 3,844,748 | 10/1974 | Lanier | 55/259 X |
| 3,944,403 | 3/1976 | Simpson et al. | 55/316 |
| 4,277,362 | 7/1981 | Mallek et al. | 110/219 X |
| 4,290,552 | 9/1981 | Prikkel, III | 110/163 X |
| 4,598,648 | 7/1986 | D'Angelo | 110/185 X |

Primary Examiner—Albert J. Makay
Assistant Examiner—Steven E. Warner
Attorney, Agent, or Firm—Jerry W. Mills; Jefferson Perkins

[57] ABSTRACT

An emergency exhaust system (59) is provided for a mobile incineration system (10). A hinged gate (76) controls access to the emergency exhaust system (59), and operates only upon the sensing of a malfunction in one of a plurality of critical incineration system components (114, 36, 56) by sensors/relays (122–126). A malfunction as sensed by Sensors/relays (122–126) causes the power to be cut through switch (98) to the main incineration system components (114, 36, 56, 46, 116, 118, 22). In a preferred embodiment, the emergency exhaust system (59) comprises a plurality of water sprayers (64) to cool the volatile waste combustion products, and a granulated activated carbon column (68) to remove hazardous substances.

28 Claims, 5 Drawing Figures

4,702,178

EMERGENCY EXHAUST SYSTEM FOR HAZARDOUS WASTE INCINERATOR

TECHNICAL FIELD

This application relates generally to the incinerating art, and more particularly to hazardous waste incineration.

BACKGROUND OF THE INVENTION

Systems for incinerating sewage sludge and the like are known in the art. In particular, an incineration system using infrared radiation to oxidize waste is disclosed by Hobbs et al., U.S. Pat. No. 4,202,282. Incineration systems of this type include a waste feed system that dumps waste into an incinerator having a belt conveyor and several infrared heating rods. Volatile components of the oxidized waste are sent through a secondary process chamber, are scrubbed and are then vented to the atmosphere. Whenever a malfunction occurs in conventional incineration systems, a valve often opens to allow the venting of the volatile combustion products directly to the atmosphere via an auxiliary stack.

Recently, the cleanup of hazardous wastes has taken on an increased importance. The hazardous waste is generally disposed of in one of two ways: it is either removed and hermetically sealed into durable containers and then buried in geologically stable formations, or it is reduced to a harmless form while being isolated from the environment.

Conventional incinerators are generally unsuitable for the disposing of waste at a hazardous waste site because of their provision for directly venting volatile waste products to the atmosphere if a malfunction in the incinerator or the main exhaust system occurs. Because of this danger of volatile product venting, incinerator workers processing hazardous waste would have to wear bulky "clean suits" and separate air supplies. This venting would also repollute the site with volatile hazardous waste.

Therefore, a need exists for an incineration system having an emergency exhaust system to process volatile combustion products of oxidized hazardous waste when the main exhaust system experiences a malfunction.

SUMMARY OF THE INVENTION

The present invention comprises an incineration system having an emergency exhaust system. In response to the sensing of a malfunction in the main exhaust system, a plate or valve diverts volatile combustion products of the combusted waste material from the main exhaust system into the emergency exhaust system. The emergency exhaust system is actuated by the sensing of the malfunction. Preferably, the emergency exhaust system acts to cool the volatile combustion products and to flow the products through a granulated activated carbon filter before venting to the atmosphere. Circuitry for shutting off the incinerator and main exhaust system may also be provided to respond to the sensing a malfunction in the main system.

BRIEF DESCRIPTION OF THE DRAWINGS

For a more complete understanding of the present invention and the advantages thereof, reference is now made to the following description taken in conjunction with the drawings in which.

DETAILED DESCRIPTION OF ILLUSTRATED EMBODIMENTS

Figure 1:
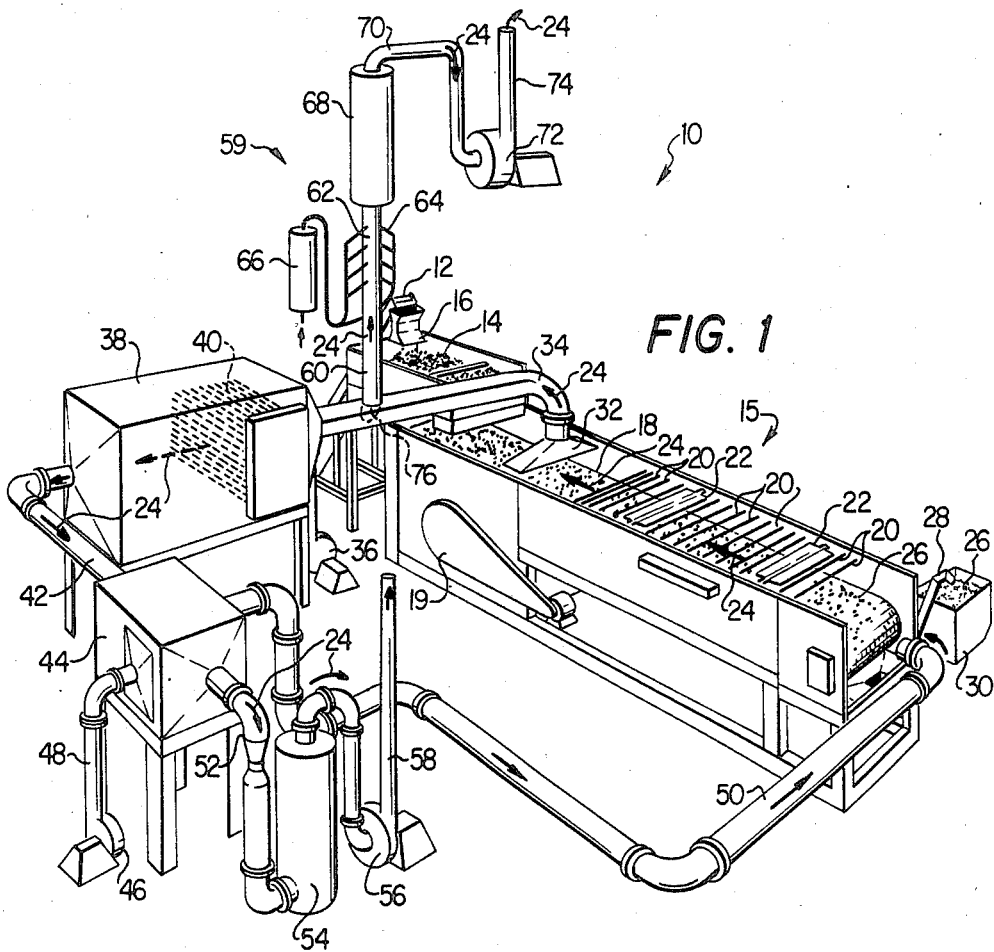
FIG. 1 is a somewhat schematic, isometric view of an incineration system according to the invention.

Referring now to FIG. 1, a preferred embodiment of the incineration system of the invention is designated generally by numeral 10. A waste feed system or conveyor 12 dumps hazardous waste onto a metering conveyor 14 through a rotary airlock 16. The metering conveyor 14 in turn conveys the waste particles to an incinerator 15. Incinerator 15 includes an incinerator conveyor 18, which receives the metered waste particles. Incinerator conveyor 18 is powered by a suitable motor and belt system 19.

Conveyor belt 18 passes the solid waste material underneath a plurality of infrared heating elements 20 and rotary rakes 22. As the hazardous waste passes underneath the heating elements 20 and rakes 22, it is oxidized into gaseous or volatile combustion products, represented by arrows 24, and a solid product or ash 26. The ash is removed by an ash discharge system 28 into a suitable receptacle 30. For additional discription of an infrared incinerator, reference is made to U.S. Pat. No. 4,202,282.

The hazardous waste volatile products 24 are blown in the opposite direction from the course of the conveyor 18 through an exhaust opening 32 into a first exhaust duct 34. When the incineration system is in normal operation, a blower 36 will draw volatile products 24 into a secondary process chamber 38. Secondary process chamber 38 may comprise a second set of heating elements 40 in order to oxidize any remaining combustible constituents.

From secondary process chamber 38, the volatile combustion products 24 exit through a second exhaust duct 42 into a combustion air preheater 44. Cold combustion air is fed into combustion air preheater 44 by a blower 46 and a duct 48, where it is preheated by drawing heat from hot volatile products 24. The preheated combustion air then exits combustion preheater 44 and proceeds via duct 50 back to incinerator 15, where it provides air to oxidize the hazardous waste material.

Volatile products 24 exit combustion preheater 44 via duct 52 into scrubber 54. Scrubber 54 cleans and cools the volatile product. The cleaned and cooled volatile product 24 is then drawn by a stack blower 56 out of scrubber 54 and is exhausted to the atmosphere via a main stack 58.

In the embodiment shown in FIG. 1, an emergency exhaust system 59 is sealably connected as by welding to the first exhaust duct 34 via an emergency exhaust duct 60. Duct 60 connects to a duct section 62 that is provided with a plurality of water sprayers 64. A water pump 66 takes in water and forces water through sprayers 64. Connected to duct section 62 is a granulated activated carbon (GAC) column 68. A duct 70 leads from the exit of GAC column 68 to an emergency stack blower 72. An emergency stack 74 is joined to the exit of emergency stack blower 72.

In the operation of emergency exhaust system 59, a plate, valve or other diverting device 76 is located at the junction of emergency duct 60 and first exhaust duct 34, as will be more particularly described below. Plate 76 diverts the volatile products 24 from first exhaust duct 34 into duct 60. Emergency stack blower 72 is activated to draw the volatile products through sprayer section 62, where the volatile products is cooled, and then through GAC column 68, where hazardous materials are filtered out from the volatile products 24. The cooled and cleaned volatile products next proceed through duct 70, blower 72 and stack 74, and are released into the atmosphere. Plate 76, sprayer pump 66 and emergency blower 72 are activated in response to the sensing of a malfunction in the main system, as will be explained in more detail below.

Figure 2:
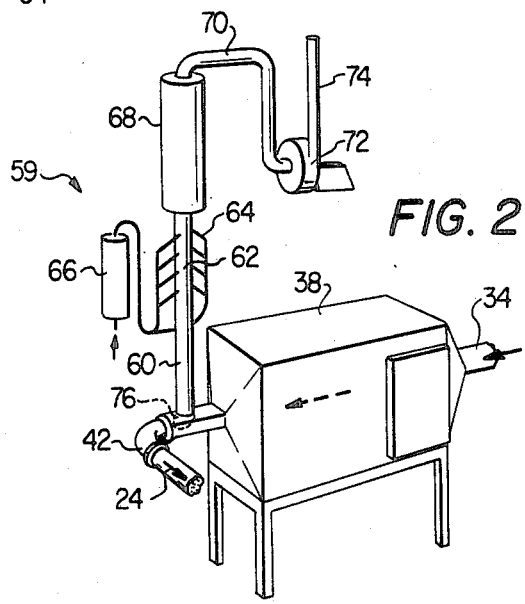
FIG. 2 is an alternate embodiment of the incineration system shown in FIG. 1, illustrating an alternate placement of an emergency exhaust system.

FIG. 2 shows an alternate location for the emergency exhaust system 59. In this embodiment, emergency exhaust duct 60 is sealably joined to second exhaust duct 42 rather than first exhaust duct 34. This allows emergency exhaust system 59 to intercept and process any unoxidized constituents left in secondary process chamber 38 when the system is shut down due to a malfunction.

Figures 3, 4:
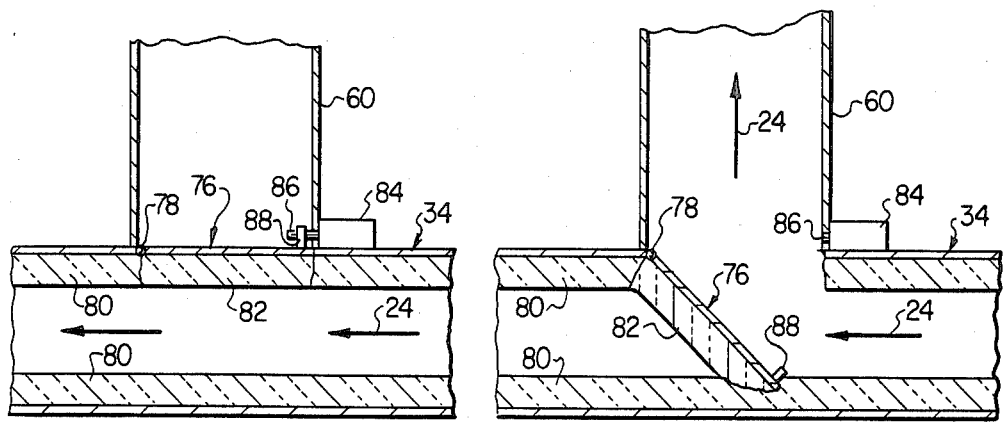
FIG. 3 is a sectional detail showing the connection of a main system exhaust duct to the emergency exhaust system, illustrating a hinged plate in a first position permitting the flow of volatile combustion products through the main exhaust system.
FIG. 4 is a sectional detail similar to FIG. 3, with the hinged plate lowered into a second position to divert the volatile combustion products into the emergency exhaust system.

FIG. 3 shows a sectional detail of exhaust duct 34, illustrating in particular the connection thereto of emergency exhaust duct 60. FIG. 3 alternatively illustrates the connection of emergency exhaust duct 60 to second exhaust duct 42 as shown in FIG. 2.

In FIG. 3, a plate 76 is hinged to the junction of duct 60 and duct 34 by hinge 78. Duct 60 is sealably joined to duct 34, as by welding, in order to prevent the escape of hazardous gases. Duct 34 has a layer 80 of insulation that prevents the radiation of dangerous heat into the environment and also preserves the temperature of the volatile product 24 for later preheating of the combustion air in preheater 44. In a preferred embodiment, insulation layer 80 is made out of a fiber blanket material that is resistant to thermal shock, so as to allow rapid heating and cooling of incinerator 15. Insulation layer 80 is somewhat yieldable in its texture. Hinged plate 76 has a similar layer 82 of this insulation on the side facing the interior of duct 34, so as to form a continuous insulated channel for volatile products 24 when the system is in normal operation.

FIG. 3 shows hinged plate 76 as latched in its normal position, allowing volatile products 24 to travel through the length of duct 34. The latching is done via a solenoid 84 that controls the position of a rod 86. In the normal position, rod 86 extends through a bracket 88.

FIG. 4 illustrates the operation of hinged plate 76. When solenoid 84 is actuated, it retracts rod 86 out of bracket 88, allowing plate 76 to drop to the floor of duct 34. The insulating layer 82 compacts into insulating layer 80, forming a sealed junction so as to prohibit the movement of volatile products 24 down through duct 34. Plate 76 acts to divert volatile products 24 up into emergency exhaust duct 60.

The shape of plate 76 should be such that it closely fits the interior walls of duct 34 while in its lowered position. Thus, if duct 34 is circular in shape, plate 76 should be oval. In the illustrated embodiment, both duct 34 and plate 76 are rectangular. The interior of duct 34 and the plate 76 have a substantially equal dimension in the direction perpendicular to the sections shown in FIGS. 3 and 4.

Hinged plate 76 can be manually raised back into its normal position after the sensed malfunction has been remedied. Suitable means may be provided to prohibit the operation of the incinerator system unless hinged plate 76 is raised back into position.

Plate 76 can be replaced with other suitable means for diverting the volatile products 24 into emergency exhaust system 59, such as a two-position rotary valve actuated to rotate by a system malfunction.

Figure 5:
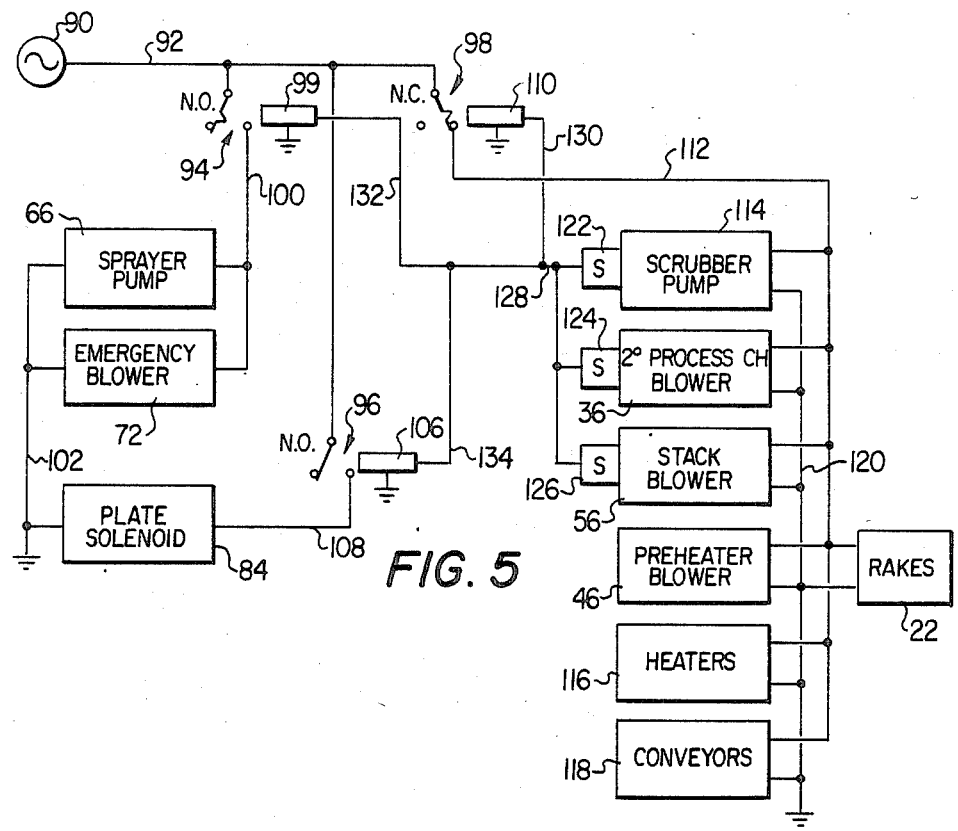
FIG. 5 is a simplified schematic electrical diagram of the incineration system of the invention.

FIG. 5 is a simplified schematic electrical diagram of the invention. Electrical power is fed from power source 90 to a line 92. Line 92 connected to a normally open switch 94, a normally open momentary switch 96 and a normally closed switch 98. Normally open switch 94 is operated by a solenoid 99, and controls the power to a line 100. Line 100 provides power to sprayer pump 66 and emergency blower 72. Sprayer pump 66 and emergency blower 72 are also provided with a ground connection 102.

Normally open switch 96 is operated by a solenoid 106. Normally open switch 96 controls the power to a line 108, which feeds power to hinged plate solenoid 84. Plate solenoid 84 is also provided with a connection to ground line 102.

Normally closed switch 98 is controlled by a solenoid 110. Closed switch 98 controls the power to a line 112, which provides power to the main system. Line 112 supplies power to a scrubber pump 114 incorporated within scrubber 54 (See FIG. 1) secondary process chamber blower 36, stack blower 56, preheater blower 46, rakes 22, heaters 116 which comprise heating elements 20 and heating elements 40, and conveyors 118 which comprise conveyor 14 and conveyor 18. Each of these main system components is also provided a ground connection to a ground line 120.

A plurality of sensors/relays 122-126 are provided, one each for each of those system components deemed essential to the prevention of the escape of hazardous material to the atmosphere or to the rendering of the hazardous waste into a less hazardous form. A sensor/relay 122 is provided for scrubber pump 114, and may sense either water flow or the rotational speed of the pump. Sensor/relay 122 is connected to a signal line 128. A sensor/relay 124 senses either the air movement or the fan speed of secondary process chamber blower 36. Likewise, a sensor/relay 126 senses either the air speed or the fan speed in stack blower 56. Sensors/relays 124 and 126 are electrically connected to signal line 128.

The invention is provided to sense a malfunction in any of a number of components in the system critical to the processing of the hazardous waste component or its isolation from the environment. In the illustrated embodiment, sensors/relays are connected to three such critical components. It should be understood that other components can likewise be provided with sensors/relays.

A branch line 130 connects signal line 128 with solenoid 110. Likewise, branch lines 132 and 134 connect signal line 128 to solenoids 99 and 106, respectively.

In normal operation, power is supplied to the main system components via the main power line 112. The power continues as long as solenoid 110 is inactivated and switch 98 is in its normally closed position.

Solenoids 99 and 106 are likewise normally inactive, allowing switches 94 and 96 to remain in their normally open positions. The plate solenoid 84, sprayer pump 66 and emergency blower 72 are therefore not activated during normal operation.

A malfunction in a corresponding main system component will cause one of sensors/relays 122-126 to send a signal along signal line 128 and branch lines 130, 132 and 134 to each of solenoids 99, 106 and 110, respectively. Thus, if sensor/relay 126 senses a loss of air speed inside stack blower 56, it will send a signal along signal line 128 to each of the three solenoids 99, 106 and 110.

A signal on line 128 is communicated via branch line 130 to solenoid 110. Solenoid 110 operates to throw switch 98 to an open position, cutting off power to main system components 114, 36, 56, 46, 116, 118 and 22. At the same time, a signal is sent through branch line 132 to solenoid 99, actuating switch 94 from its normally open position to a closed position. Power is thus provided via lines 92 and 100 to sprayer pump 66 and emergency blower 72, in effect actuating the emergency exhaust system 59. Finally, the signal is sent via branch line 134 to solenoid 106, which operates to momentarily close the normally open switch 96. This provides power to line 108 and solenoid 84. Solenoid 84 in turn withdraws rod 86 (see FIG. 3) to allow hinged plate 76 to fall to its emergency position. The volatile combustion product 24 of the hazardous waste material are thus diverted into emergency exhaust system 59.

In summary, an emergency exhaust system has been provided in order to make mobile incinerating systems suitable for disposing hazardous wastes on-site. The emergency exhaust system of the invention is operated in response to a malfunction sensed in one of the critical components of the main incineration system. Apparatus are also preferably provided to shut down the main incineration system in response to the sensed malfunction.

In a preferred embodiment, the emergency exhaust system includes a section of water sprayers in order to cool the volatile waste combustion products, and a granulated activated carbon column in order to remove hazardous substances from the volatile products. Because hazardous wastes are thus not vented to the atmosphere during a main system malfunction, the incineration system of the invention is safer to operate.

Various changes and substitutions can be made to the above illustrated embodiments without departing from the spirit and scope of the invention. In particular, other electrical connections and devices than those shown in FIG. 5 can be used to implement the invention. It will be understood that the invention is not limited to the embodiments described, but only by the appended claims.

What is claimed is:

1. An incineration system, comprising:
   an incinerator adapted for combusting waste materials;
   a main cleaning system coupled to the output of said incinerator for cleaning volatile combustion products from said incinerator, said main cleaning system including at least one component critical to either the processing of the hazardous waste into less hazardous form or the isolation of the hazardous waste from the environment, means for sensing a malfunction provided for said at least one component and for said incinerator;
   a normally inoperable emergency exhaust system coupled to said incinerator;
   said means for sensing a malfunction operable to render said emergency exhaust system operable in response to a malfunction of said incinerator or said main cleaning system.

2. The incineration system of claim 1, wherein said emergency cleaning system includes a granulated activated carbon column through which the volatile combustion products are passed.

3. The incineration system of claim 1, wherein said emergency cleaning system includes a plurality of water sprayers in order to lower the temperature of the volatile combustion products.

4. The incineration system of claim 1, wherein said emergency cleaning system includes means for flowing the volatile combustion products therethrough.

5. The incineration system of claim 1, wherein said at least one component comprises a scrubber.

6. The incineration system of claim 1, wherein said at least one component comprises at least one means for flowing said combustion product through said main cleaning system.

7. In an incineration system including an incinerator for combusting waste material and a main cleaning system coupled to the output of said incinerator for cleaning volatile combustion products from said incinerator, the improvement comprising:
   an emergency exhaust system including at least one normally inoperable emregency exhaust system component, said emergency exhaust system communicating with said incinerator;
   means for sensing a malfunction provided for said at least one component and for said incinerator;
   means for rendering said at least one emergency exhaust system component operable in response to said means for sensing a malfunction in said incinerator or in said main cleaning system, said means for rendering also actuating means for diverting said volatile products into said emergency exhaust system.

8. The improvement of claim 7, wherein said main cleaning system includes a plurality of components that are each critical to either the processing of the hazardous waste into less hazardous from or the isolation of the hazardous waste from the environment, means for sensing a malfunction provided for each of said components and operable to actuate said means for diverting to divert the volatile products into said emergency cleaning system.

9. An incineration system for hazardous wastes, comprising:
   an incinerator adapted for combusting waste materials;
   a first exhaust duct for removing volatile combustion products from said incinerator to a secondary process chamber;
   a second exhaust duct for removing said volatile products from said secondary process chamber to a main exhaust system, said main exhaust system including a scrubber for cleaning said volatile products before releasing them to the atmosphere, means for flowing said volatile products through said secondary process chamber and through said scrubber;
   an emergency exhaust system connected to one of said exhaust ducts, said emergency exhaust system including a plurality of emergency exhaust components operable to process said volatile products upon the sensing of a malfunction in said main exhaust system or said means for flowing; and means for diverting said volatile products from said main exhaust system into said emergency exhaust system upon the sensing of said malfunction.

10. The incineration system of claim 9, wherein said emergency exhaust components comprise a plurality of water sprayers for reducing the temperature of said volatile products, a granulated activated carbon column after said sprayers for removing hazardous components from said volatile products, and an emergency blower for drawing said volatile products from said means for diverting through said sprayers, through said granulated activated carbon column, and out into the atmosphere, said sprayers having a sprayer pump, said emergency blower and said sprayer pump actuated by means sensing said malfunction.

11. The incineration system of claim 9, wherein said emergency exhaust system is connected to said first exhaust duct.

12. The incineration system of claim 9, wherein said emergency exhaust system is connected to said second exhaust duct.

13. The incineration system of claim 9, wherein said scrubber includes a scrubber pump for recirculating water through the scrubber, means for sensing a malfunction in said scrubber pump operable to actuate said emergency exhaust components and said means for diverting.

14. The incineration system of claim 13, wherein said means for sensing a malfunction in said scrubber pump senses the flow of water through the pump.

15. The incineration system of claim 9, wherein said means for flowing comprises at least one blower blowing air through said scrubber, means for sensing a malfunction in said blower actuating said means for diverting said volatile products into said emergency exhaust system.

16. The incineration system of claim 15, wherein said means for sensing a malfunction in said blower measures the speed of a blower fan.

17. The incineration system of claim 15, wherein said means for sensing a malfunction in said blower comprises means for sensing air movement.

18. The incineration system of claim 9, wherein said means for diverting comprises a hinged plate movable between a first position and a second position in response to the sensing of a malfunction, said plate allowing the passage of said volatile products through said exhaust duct in said first position, said hinged plate preventing the passage of said volatile products through said exhaust duct in the second position but instead diverting said volatile products into said emergency exhaust system.

19. The incineration system of claim 18, wherein said hinged plate is latched into said first position by a rod movable between an extended position and a retracted position, a solenoid operable to withdraw said rod to said retracted position in response to said sensed malfunction, said hinged plate then moving to said second position.

20. The incineration system of claim 18, wherein said exhaust duct is insulated with an insulation layer, said hinged plate having a layer of insulation on a side facing the interior of said exhaust duct while said plate is in said first position.

21. The incineration system of claim 18, wherein a section of said one of said exhaust ducts is rectangular in shape, said hinged plate being rectangular in shape and closely fitting the interior walls of said one of said exhaust ducts while in said second position.

22. A method for disposing hazardous wastes, comprising the steps of:

incinerating a hazardous waste material in an incinerator;

removing volatile combustion products from the incinerator;

cleaning the volatile products in a main cleaning system before releasing the volatile products to the atmosphere;

sensing a malfunction in the incinerator or the cleaning system;

diverting the volatile products from the main cleaning system into an emergency exhaust system in response to sensing the malfunction;

operating at least one emergency cleaning component of the emergency exhaust system responsive to sensing the malfunction; and cleaning the volatile products in the emergency exhaust system prior to releasing the volatile products to the atmosphere.

23. The method of claim 22, wherein the at least one emergency cleaning component comprises a sprayer for spraying the volatile product with water in order to reduce its temperature.

24. The method of claim 22, wherein the at least one emergency cleaning comprises a blower for blowing the volatile products through a granulated activated carbon column in order to remove hazardous constituents from the volatile products.

25. The method of claim 22, wherein the step of sensing a malfunction comprises sensing a malfunction in at least one of a plurality of cleaning system components that are critical to the processing or isolation of hazardous waste.

26. The method of claim 22, wherein the step of sensing a malfunction includes sensing a malfunction in a scrubber pump included in the main cleaning system.

27. The method of claim 22, wherein the step of sensing a malfunction includes sensing a malfunction in a means for flowing the volatile combustion products through the main cleaning system.

28. The method of claim 22, further including the step of shutting down the incinerator and the main cleaning system in response to sensing the malfunction.

* * * * *